United States Patent
Bent

[11] 3,807,745
[45] Apr. 30, 1974

[54] KEYLESS DRILL CHUCK

[76] Inventor: John H. Bent, 1201-73 Valencia Dr., Fullerton, Calif.

[22] Filed: Mar. 15, 1973

[21] Appl. No.: 341,766

[52] U.S. Cl. .................................... 279/60, 279/62
[51] Int. Cl. ........................................... B23b 31/12
[58] Field of Search ............ 279/60, 62, 61, 63, 64, 279/69

[56] References Cited
UNITED STATES PATENTS
2,458,626  1/1949  Norige ................................ 279/62

*Primary Examiner*—Gil Weidenfeld
*Attorney, Agent, or Firm*—Lyon & Lyon

[57] ABSTRACT

A keyless chuck for a drill bit shank or the like has converging jaws guided for sliding movement on a central body member, and a rotary nut has internal threads which advance or retract the jaws. A sleeve mounted to turn on the body encircles the nut, and confronting helical cam segments are provided on the sleeve and on the nut to form a continuous annular cam track encircling the jaws. A full complement of balls fills the annular cam track. Belleville washers are compressed by axial movement of the nut, acting through a thrust bearing assembly. In operation, initial turning movement of the sleeve turns the nut and cam track and balls as a unit until the jaws grip the tool shank, and continued turning movement of the sleeve moves the nut axially to compress the Belleville washers, and apply additional tightening force to the jaws.

5 Claims, 6 Drawing Figures

PATENTED APR 30 1974 3,807,745
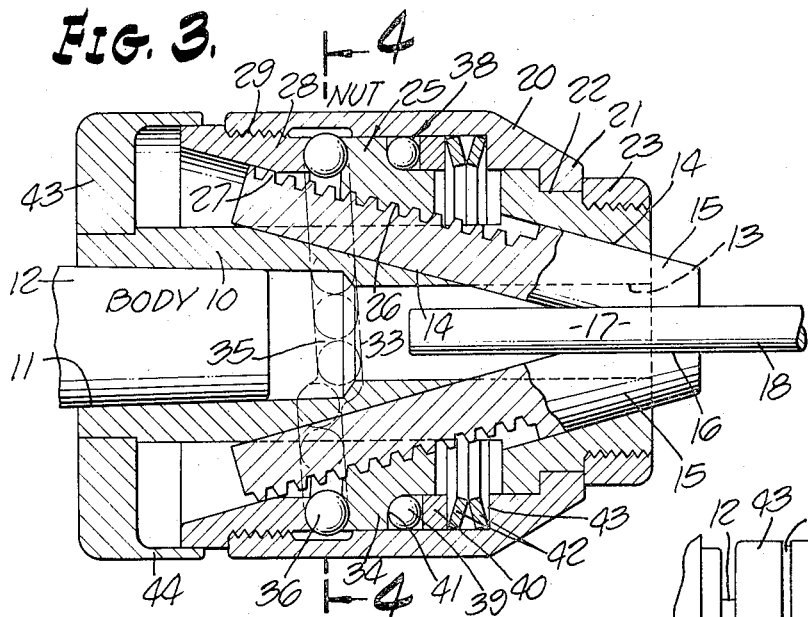
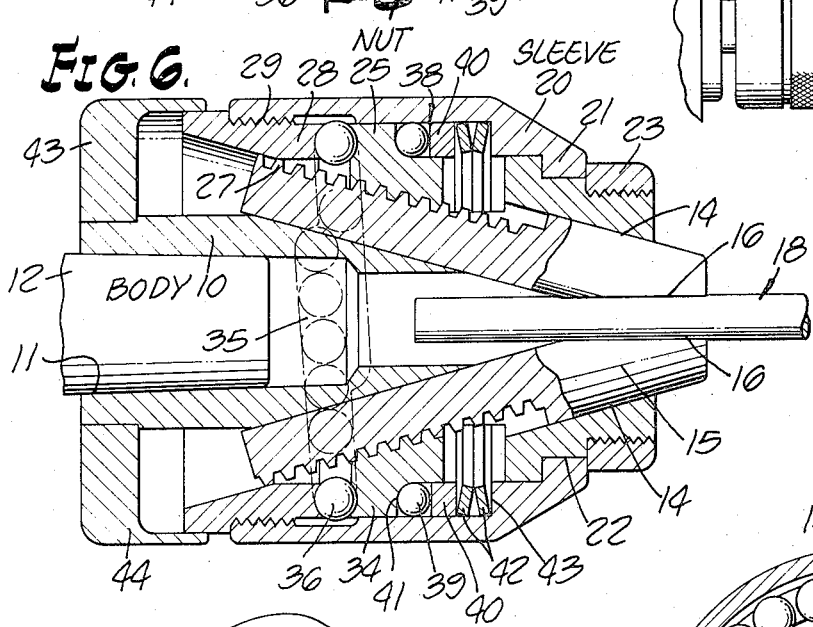
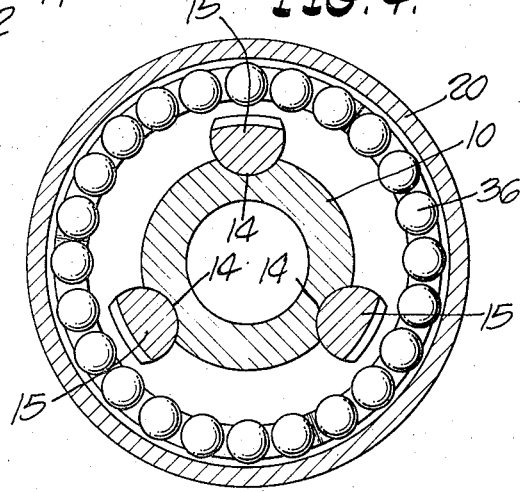

KEYLESS DRILL CHUCK

This invention relates to releasable chucks of the type commonly used to grip the shank of a tool such as a drill bit. Converging jaws are guided for sliding movement in a central body member and the jaws are advanced and retracted by means of a rotary nut having internal threads. In a well known commercial form of device of this type, the nut is provided with gear teeth which may be engaged by teeth on a pinion gear on a removable part known as a "key." In operation, a projection on a key is thrust into a bearing opening in the central body to bring the gear teeth on the key into engagement with the gear teeth on the rotary nut, so that turning movement of the key provides a mechanical advantage for turning the nut.

The key with its pinion gear is a loose part and must be manually inserted and withdrawn each time a drill bit or other tool is to be clamped by the jaws. It must always be withdrawn before the chuck is rotated under power because if not withdrawn it may catch the hand or clothing of the operator and produce serious injury, or it may be flung outward be centrifugal force with consequent damage or injury.

It is an important object of this invention to provide a tool chuck of the type described which does not employ a separate key, but which has a built-in structure which makes manual tightening of the external sleeve easy to perform, and to produce a maximum gripping action on the shank of the drill bit or other tool. The nut which advances and retracts the gripping jaws is turned by the sleeve but a large diameter cam device is interposed between the sleeve and the nut. The cam parts and nut rotate as a unit with the sleeve until the gripping jaws engage the tool shank. Further turning movement of the sleeve causes the cam device to move the nut axially against a stiff spring, and this axial movement of the nut, although slight, produces an increase in the gripping action of the jaws upon the tool shank. Stated in other terms, a "gearshift" is provided internally of the chuck mechanism so that initial turning movement of the manually operated sleeve causes the jaws to advance or retract by reason of their threaded connection with the nut, while continued turning movement of the sleeve after the jaws have engaged the tool shank causes the cam device to move the nut axially and without rotation. In this way a much higher gripping force is generated by the same degree of angular movement of the manually operated sleeve.

Other and more detailed objects and advantages will appear hereinafter.

In the drawings:

FIG. 1 is a side elevation showing a preferred embodiment of this invention.

FIG. 2 is an end elevation.

FIG. 3 is a sectional view taken substantially on the lines 3—3 as shown on FIG. 2.

FIG. 4 is a transverse sectional view taken substantially on the lines 4—4 as shown on FIG. 3.

FIG. 5 is a perspective view of a portion of the sleeve showing the helical cam segments thereon.

FIG. 6 is a sectional elevation similar to FIG. 3, showing the jaws in position for maximum gripping force on the tool shank.

Referring to the drawings, the central body member 10 is provided with a taper socket 11 for reception of a driving spindle 12. An axial cylindrical bore 13 in the other end of the body 10 is interrupted by three converging guideways 14 which receive the three gripping jaws 15 in sliding relation. Each of the jaws 15 has a grip portion 16 for engagement with the shank 17 of a tool, for example a drill bit 18.

A manually operable external sleeve 20 is mounted to turn on the body member 10; an inward directed skirt 21 on the end of the sleeve 20 is received in a groove 22 provided on the body member 10 and threaded collar 23. A rotary nut 25 encircles the jaws 15 and is provided with internal threads 26 which mesh with external threaded sections 27 on each of the jaws 15, so that turning movement of the rotary nut 25 serves to advance and retract the jaws 15 with respect to the shank 17 of the tool 18.

In accordance with this invention the sleeve 20 is provided with a ring portion 28 which is connected to the sleeve by threads 29 and which functions as an integral part of the sleeve 20. This ring portion 28 of the sleeve 20 has a plurality of helical cam segments 30 formed on one end thereof. Three cam segments of equal arcuate length are shown in FIG. 5 of the drawings. Each has a high point 31 and a low point 32 connected by a helical surface of relatively low helix angle and curved in cross section as shown in FIGS. 3 and 4. Similar helical cam segments 33 are formed on one side of the radial flange 34 of the rotary nut 25. Thus, there are provided confronting helical cam segments on the ring portion 28 of the sleeve 20 and on the flange 34 of the rotary nut 25, thereby forming a continuous annular cam track generally designated 35. A full complement of anti-friction balls 36 is positioned in said annular cam track 35 and the construction is such that the balls 36 may move from one helical segment to another.

The thrust bearing assembly 38 includes a series of balls 39 and an annular race 40. The balls 39 engage the race 40 on one side and engage the side surface 41 of the flange 34 on the other side. A pair of Belleville washers 42 are engaged by the annular race 40 on one side and by a shoulder 43 on the sleeve 20 on the other side. Movement of the rotary nut 25 to the right as viewed in FIGS. 3 and 6 causes the thrust bearing assembly 38 to compress the Belleville washers 42. A closure flange 43 is fixed to and forms a part of the body 10 and this flange 43 has an axially extending lip 44 which encircles a portion of the part 28.

In operation, the driving spindle 12 is engaged within the taper socket 11 of the body member 10. The sleeve 20 is then manually rotated to move the jaws 15 so that their gripping portion 16 contacts the shank 17 of a tool such as drill bit 18. During this rotary movement of the sleeve 20, the ring portion 28, the balls 36 and the rotary nut 25 all turn as a unit. When the jaws 15 engage the shank 17, however, a relatively coarse feed provided by the threads 26, 27 comes to an end. Continued turning movement of the sleeve 20 under manual manipulation causes the balls 36 to ride along the helix path of the surfaces 30 and 33 and thereby move the nut 25 in an axial direction to cause the thrust bearing 38 to compress the Belleville washers 42. The helix angle of the surfaces 30 is very small so that a significant mechanical advantage is achieved in substantially increasing the gripping pressure of the jaws 15 in response to a turning movement of the sleeve 20.

The outer surface of the lip 44 on the flange 43 may be manually gripped to hold the body 10 stationary while the sleeve 20 is being manually rotated.

From this description it will be understood that initial turning movement of the sleeve 20 causes a rapid advance of the jaws toward gripping position by reason of the threaded connection 26, 27 whereas continued turning movement of the sleeve 20 results in a cam action which moves the nut 25 axially to increase the tightness of the grip of the jaws. Conversely, the tight grip is first relaxed by reverse turning motion of the sleeve 20, causing a relative turning movement of the helical cam surfaces 30, 33, followed by rotation of the nut 25 for rapid retraction of the jaws 15.

In a typical example, a chuck constructed in accordance with this disclosure for gripping a tool shank 17 no larger than one-quarter inch in diameter, employs balls 36 of one-eighth inch diameter and a helix angle on the order of one degree. The load carried on each ball 36 is reduced by the fact that the annular cam track 35 is as large in diameter as is possible and a full complement of balls is employed. In this way "brinelling" action of the balls on the helix surfaces is avoided. Assembly of the parts of the keyless chuck device is accomplished in the following manner: The nut 25 is first installed on the body 10 in a fully forward position with the nut in contact with the body shoulder 46. The three jaws 15 are then inserted in sequence through the guideways 14 and through the interior of the nut 25. The jaws 15 are then aligned so that they project an equal distance from the body 10, and the nut 25 is then turned to produce threaded engagement with each of the jaws 15. The Belleville washers 42, thrust ring 40 and balls 39 are then installed in place. The sleeve 20 is then moved axially into position and is retained by the threaded collar 23. The helix balls 36 are then installed and the portion 28 of the ring is then threaded into position. The assembly is completed by pressing the flange 43 into position on the body 10.

Having fully described my invention, it is to be understood that I am not to be limited to the details herein set forth but that my invention is of the full scope of the appended claims.

I claim:

1. In a chuck, the combination of; a central body member, converging jaws guided for sliding movement upon said body member and shaped to grip an axial tool shank between them, a nut encircling the jaws, thread means connecting the nut to the jaws, a sleeve member encircling the nut, means mounting said sleeve member for turning movement on said body member but preventing relative axial movement therebetween, helical cam means on said sleeve member and on said nut forming a continuous annular cam track encircling the jaws, antifriction elements positioned in said annular cam track, means including resilient means and a thrust bearing operatively interposed between said nut and said sleeve member whereby initial turning movement of one member relative to the other causes the jaws to grip the tool shank, and continued relative turning movement of said members moves the nut axially against said resilient means.

2. In a chuck having converging jaws guided for sliding movement upon a central body member and shaped to grip an axial tool shank between them, the jaws each having thread elements engaged by internal threads on a nut encircling the jaws, the improvement comprising, in combination; a sleeve member encircling the nut, means mounting said sleeve member for turning movement on said body member but preventing relative axial movement therebetween, means providing confronting cam surfaces on said sleeve member and on said nut forming a continuous annular cam track encircling the jaws, antifriction elements positioned in said annular cam track, and means including resilient means operatively interposed between said nut and said sleeve member.

3. In a chuck having converging jaws guided for sliding movement upon a central body member and shaped to grip an axial tool shank between them, the jaws each having thread elements engaged by internal threads on a nut encircling the jaws, the improvement comprising, in combination; a sleeve member encircling the nut, means mounting said sleeve member for turning movement on said body member but preventing relative axial movement therebetween, means providing a plurality of confronting helical cam segments on said sleeve member and on said nut forming a continuous annular cam track encircling the jaws, a full complement of balls in said annular track, means including resilient means and a thrust bearing operatively interposed between said nut and said sleeve member, whereby initial turning movement of said sleeve member relative to said body member turns the nut and cam track balls as a unit therewith until the jaws grip the tool shank, and continued turning movement of said sleeve member causes the balls to move the nut axially against said resilient means.

4. The combination set forth in claim 3 in which said resilient means comprises Belleville washers encircling the jaws.

5. The combination set forth in claim 3 in which said nut has a radially extending flange provided with helical cam segments on one side of the flange, the other side of the flange providing a race for said thrust bearing.

* * * * *